F. J. METZGER.
PRODUCTION OF HYDROCYANIC ACID.
APPLICATION FILED MAY 3, 1919.
1,385,335.
Patented July 19, 1921.
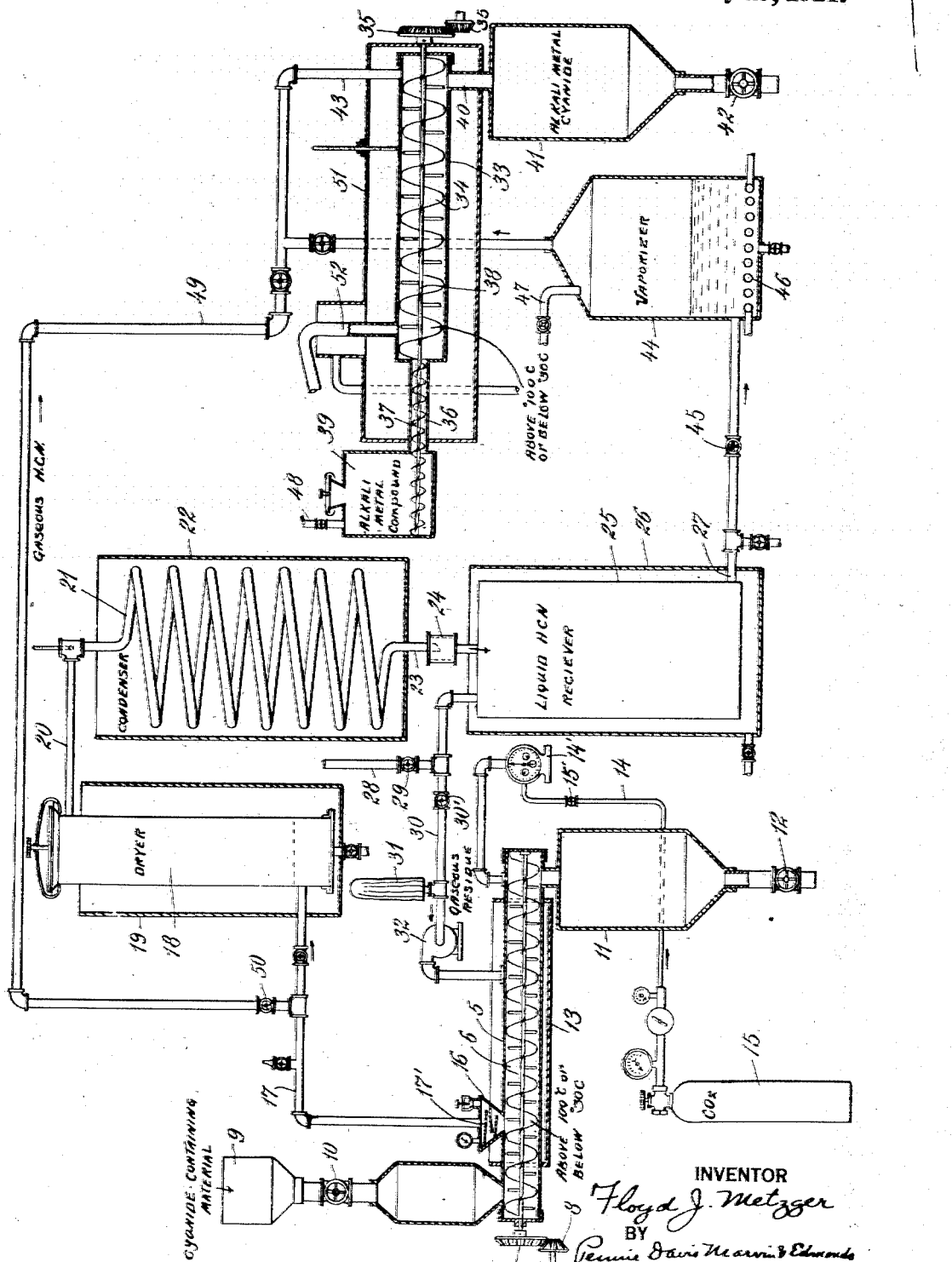

UNITED STATES PATENT OFFICE.

FLOYD J. METZGER, OF NEW YORK, N. Y., ASSIGNOR TO AIR REDUCTION COMPANY, INC., A CORPORATION OF NEW YORK.

PRODUCTION OF HYDROCYANIC ACID.

1,385,335.     Specification of Letters Patent.     Patented July 19, 1921.

Application filed May 3, 1919. Serial No. 294,377.

*To all whom it may concern:*

Be it known that I, FLOYD J. METZGER, a citizen of the United States, residing at New York city, in the county of New York, State of New York, have invented certain new and useful Improvements in the Production of Hydrocyanic Acid; and I do hereby declare the following to be a full, clear, and exact description of the invention, such as will enable others skilled in the art to which it appertains to make and use the same.

This invention relates to the production of hydrocyanic acid from more or less pure materials, such as chemically or commercially pure cyanids or from raw materials, such, for example, as are produced by heating a mixture of alkali metal compounds and carbon, with or without a catalyzer, in the presence of nitrogen or nitrogenous gases. The invention is likewise applicable to the production of hydrocyanic acid from crude cyanid products obtained by the heating of materials such as calcium cyanamid with an alkali salt such as sodium carbonate or sodium chlorid. My invention also contemplates the production of substantially pure alkali metal cyanids from crude products containing cyanids, by first recovering hydrocyanic acid from such crude materials and subsequently absorbing the hydrocyanic acid in alkali metal hydroxids.

The objects of the invention are the production of hydrocyanic acid in a relatively inexpensive and effective manner and in a condition for commercial utilization, and the recovery of hydrocyanic acid and cyanids from crude materials containing cyanids produced in various ways and particularly by methods involving the fixation of nitrogen.

Other objects and advantages of my invention will be apparent as it is better understood by reference to the following specification when read in connection with the accompanying drawing in which I have diagrammatically illustrated an apparatus adapted for use in the application of the invention.

Hydrocyanic acid is widely used at the present time as a disinfecting material and is particularly valuable as an insecticide for trees and shrubbery. In employing this material as a disinfectant or insecticide, gaseous hydrocyanic acid is commonly released in the room or within a suitable inclosure surrounding a tree, for example, by treating an alkali metal cynid such as commercial sodium cyanid with an acid such as sulfuric acid. This method of application has many disadvantages, such as the hazard involved in permitting ordinary workmen to carry out the necessary operation of releasing the hydrocyanic acid gas, and the relatively more important consideration that the reaction involved is quite incomplete even under the most favorable circumstances. The yield under such circumstances does not exceed approximately 75% of the theoretical and under normal conditions, not more than 50% of the cyanid is available in disinfecting fruit trees where heat and other means tending to increase the yield cannot be advantageously applied.

I have discovered that hydrocyanic acid may be produced simply and cheaply and with a high degree of efficiency, the recovery approaching the theoretical, from relatively pure or crude cyanid materials thus rendering the hydrocyanic acid readily available in a substantially pure form for various uses. My invention may thus be utilized solely for the purpose of producing hydrocyanic acid from pure or crude materials. Where crude materials are treated and relatively pure cyanids are desired, the hydrocyanic acid, first liberated, may be recombined with alkali metal hydroxids to produce the desired cyanids.

The hydrocyanic acid in a gaseous condition may be readily liquefied and stored in convenient containers from which it may be withdrawn as needed. It can, for example, be permitted to escape from such containers within a room to be disinfected or within a temporary inclosure disposed about a fruit tree. The hydrocyanic acid gas may be combined, as formed, directly with alkali metal hydroxids, or it may be first liquefied, then revaporized and combined with alkali metal hydroxid as hereinafter described.

The invention, broadly considered, involves the formation of hydrocyanic acid from cyanid-containing materials by decomposing such materials with carbon dioxid applied under suitable and regulated conditions. It has been previously known that carbon dioxid would react with alkali metal cyanid in the presence of moisture to produce hydrocyanic acid. The yield of hydrocyanic acid, however, under ordinary working conditions is extremely small. When carbon dioxid is passed over an alkali metal cyanid in the presence of moisture, heat is developed in considerable quantities. The hydrocyanic acid produced is polymerized as rapidly as it is liberated and the polymer remains in the cyanid material; substantially no hydrocyanic acid being liberated. At the normal temperature of the reaction, not more than a few per cent. of the theoretical amount of hydrocyanic acid would be produced.

I have discovered after a series of experiments and tests that the poor yield above referred to is the result of unregulated temperature conditions and that a substantially theoretical yield results when the temperature conditions are carefully controlled. If the temperature of the mass is maintained in the neighborhood of 0° C., or slightly above during the reaction, polymerization does not occur to any appreciable extent and a substantially theoretical yield of hydrocyanic acid can be obtained from alkali metal cyanid. If the temperature is permitted to rise to substantially 30 to 40° C. the reaction will proceed more rapidly but the yield of hydrocyanic acid will be very low, for example, in the neighborhood of 50% of the theoretical. Below 30° C. the yield will increase to substantially the theoretical depending upon the temperature maintained. I have discovered further that if the mass being treated is held at a comparatively high temperature as, for example, in the neighborhood of 130° to 150° C., the reaction proceeds very rapidly and the yield of hydrocyanic acid is in the neighborhood of 80% of the theoretical.

Thus, while it appears that the process of liberating hydrocyanic acid, by means of carbon dioxid, is substantially worthless from a commercial standpoint, when permitted to proceed without regulation of the temperature, it is capable of producing hydrocyanic acid cheaply and effectively when through careful regulation, the reaction temperature is maintained either well below or well above the normal temperature of the reaction. The reactions taking place in the production of hydrocyanic acid in accordance with my invention may be represented as follows:

$$2NaCN + CO_2 + H_2O = 2HCN + Na_2CO_3.$$

This reaction may be followed by secondary reactions depending upon conditions. For example, carbon dioxid passing over moist sodium carbonate at low temperature results in the formation of a certain amount of bicarbonate as follows:

$$Na_2CO_3 + H_2O + CO_2 = 2NaHCO_3.$$

This requires the employment of a larger quantity of carbon dioxid to complete the reaction but does not affect the yield of hydrocyanic acid. At the higher temperatures, for example, in the neighborhood of 130° to 140° C. no bicarbonate is formed.

The apparatus illustrated in the accompanying drawing is well adapted for the purpose of carrying out the invention. The invention is not, however, dependent upon any particular type of apparatus and the latter may be varied and substantially modified without affecting the invention or the accomplishment of the desired purpose. Referring to the drawing, 5 indicates a reaction chamber which as illustrated may be a cylinder, having a worm conveyer 6 disposed therein and adapted to be driven from a suitable source of power, for example, through the gears 7 and 8. A feed hopper 9 is provided to supply the cyanid-containing material to the reaction chamber, a valve 10 preventing escape of gases from the hopper. The material after treatment is discharged to a receiver 11 having a valve 12 which prevents escape of gases therefrom.

To maintain and regulate the temperature of the reaction the cylinder 5 is provided with a suitable jacket 13, which, in the present instance, is illustrated as a trough adapted to be filled with a cooling medium, for example, ice, brine, or water which is cooled by the circulation of brine through suitable coils disposed within the trough. If the operation is to be carried out at high temperatures, the jacket 13 may be closed and the temperature may be maintained by circulation of steam or heated oil through the jacket.

The carbon dioxid is delivered to the reaction chamber 5 through a pipe 14 which is supplied from a suitable source of this gas as, for example, the "bottle" 15 in which the carbon dioxid is stored under pressure. Obviously any suitable source as, for example, a gasometer may be substituted for the "bottle" 15. A meter 14' and valve 15' in the pipe 14 permit regulation of the supply of carbon dioxid.

The gaseous hydrocyanic acid escapes from the cylinder 5 through an outlet 16 which is preferably provided with baffles 17' to prevent the escape of dust from the cylinder into the pipe 17, through which the hydrocyanic acid is conveyed to a drying chamber 18. The latter may be filled with sodium bisulfate, calcium chlorid, or other material adapted to separate the moisture from the gas. The drying chamber is preferably surrounded by a chamber 19 containing a medium adapted to maintain a temperature sufficiently high to prevent condensation of the hydrocyanic acid, for example, in the neighborhood of 30° to 50° C.

The dried hydrocyanic acid escapes from the drying chamber 18 through a pipe 20 and is delivered to a coil 21 disposed within a container 22 in which the cooling medium is held at a temperature sufficiently low to condense the hydrocyanic acid gas as it passes through the coil. The hydrocyanic acid gas may be compressed prior to delivery to the condensing coil 21. The liquefied gas escapes through an outlet 23 preferably having a sight glass 24 and is delivered to a receiver 25 for the liquid. The receiver 25 is surrounded by a jacket 26 in which a cooling medium is maintained to prevent evaporation of the liquid. The liquid may be withdrawn as required through an outlet 27.

A vent pipe 28 is connected to the receiver 25 to deliver any uncondensed gas from the building in which the apparatus is housed. It may be desirable to return the uncondensed gas, which may contain carbon dioxid and hydrocyanic acid, to the reaction chamber. In this event, a valve 29 is provided in the vent pipe 28 and a pipe 30 is connected to the vent pipe 28 below the valve and to the reaction chamber. A valve 30' is provided in the pipe 30 to prevent circulation of the gas when desired. Preferably an equalizing device 31, such as a gas bag, is connected to the pipe 30 and a blower 32 is provided to force the circulation of the gas through the system.

In carrying out the invention the cyanid containing material, as previously noted, may be chemically or commercially pure alkali metal cyanid, material containing cyanid, such as is derived from the treatment of calcium cyanamid with alkali metal carbonate or chlorid, or furnace products resulting from the heating of the mixture of alkali metal compound and carbon, with or without a catalyzer, in the presence of nitrogen. The cyanid-containing material is moistened with preferably from 5 to 20% of water and is fed through the reaction chamber 5 from the hopper 9. In the reaction chamber, the material is subjected to the action of carbon dioxid which is delivered in regulated quantities through the pipe 14 from the source of this gas. The reaction proceeds at a temperature which is carefully regulated through the employment of a cooling or heating medium in the jacket 13 as previously described. The hydrocyanic acid withdrawn through the pipe 17 is dehydrated in the drying chamber 18, liquefied in the coil 21 and is finally recovered from the receiver 25. Unliquefied gases may be vented through the pipe 28 or returned through the pipe 30 to the reaction chamber.

While the invention is described with particular reference to the use of carbon dioxid in a substantially pure condition, the reaction proceeds with substantially similar results where gases containing carbon dioxid in considerable quantity are substituted. For example, furnace gases contain relatively large quantities of carbon dioxid, and are available for the purpose of carrying out the reaction. When furnace gases are employed as a source of carbon dioxid the spent gases are vented through the pipe 28 and any hydrocyanic acid remaining in these gases may be recovered by means of a suitable scrubber containing, for example, a solution of alkali metal hydroxid or iron compound suspended in an alkaline medium.

While a considerable field exists for the employment of hydrocyanic acid gas as such, an even larger demand exists for high grade alkali metal cyanids. These high grade cyanids may be readily produced by absorbing the gaseous hydrocyanic acid in a suitable absorbent such, for example, as alkali metal hydroxids. The hydrocyanic acid may be absorbed directly from the delivery line leading from the reaction chamber. In this event it is, of course, necessary to so proportion the carbon dioxid employed to the cyanid treated that no appreciable excess of carbon dioxid remains in the gases issuing from the reaction chamber. Otherwise, an inferior product would be obtained containing an appreciable amount of alkali metal carbonate.

Preferably the gaseous hydrocyanic acid is first liquefied and thus separated from any carbon dioxid which may have escaped the reaction chamber. The liquefied hydrocyanic acid may then be revaporized and delivered to the absorption chamber in a practically pure state. The product resulting, where alkali metal hydroxids are employed, is substantially pure alkali metal cyanid. The alkali metal hydroxid may be employed either as a solution or in a solid state. The solid hydroxid is, however, preferred.

If an attempt is made to absorb hydrocyanic acid directly in alkali metal hydroxid without regulation of the temperature, the hydrocyanic acid will polymerize or be decomposed to ammonia and the product will be practically worthless. I have discovered that this difficulty may be readily overcome by suitable regulation of the absorption temperature. In the event that absorption is carried out in a solution of alkali metal hydroxid, the temperature should be maintained in the neighborhood of 0° C. to prevent polymerization. The cyanid liquor thus obtained may be evaporated under vacuum to recover the cyanid. Where solid alkali metal hydroxid is employed as an absorption agent, the temperature may be regulated either by cooling to substantially 0° C. or preferably by heating the absorption chamber to a temperature above the boiling point of water, for example, in the neighborhood of 120° to 150° C. If cooling is resorted to during absorption of hydrocyanic acid in solid alkali metal hydroxid, the final product contains a considerable quantity of combined water. The product, while substantially pure cyanid, is inferior because of the water content. If the absorption chamber is heated during absorption substantially all of the water escapes in the form of steam and the product is not only substantially pure, but is substantially free from combined water and is, therefore, of a very superior quality.

In the drawing I have illustrated the apparatus as adapted for use in absorbing hydrocyanic acid in solid alkali metal hydroxid. As previously noted, the drawing is illustrative merely, and is intended to assist in the proper understanding of the method rather than to show exact details of the apparatus employed.

In the drawing the absorption chamber 33 is indicated as a cylinder having a worm conveyer 34 disposed therein and driven by a suitable source of power through gears 35. An inlet 36 to the absorption chamber contains a worm conveyer 37 disposed on the shaft 38 of the conveyer 34. The worm conveyer 37 is of somewhat smaller diameter than the conveyer 34 and is adapted to deliver the alkali metal hydroxid from a hopper 39 to the absorption chamber 33. By employing the smaller feed conveyer 37 the alkali metal hydroxid is prevented from choking the absorption chamber. Thus the continuance and success of the absorption process is assured.

The product of the absorption is delivered through an outlet 40 to the receiver 41 having a valve 42 through which the material is finally discharged. The gaseous hydrocyanic acid is delivered to the absorption chamber through a pipe 43 connected to a source of gaseous hydrocyanic acid which may be a vaporizing chamber 44, connected to the outlet pipe 27 of the receiver 25. A valve 45 permits the liquefied hydrocyanic acid to flow from the receiver 25 as it accumulates therein to the vaporizing chamber 44. The vaporizing chamber may be provided with suitable means for heating, such as the coil 46 through which warm air or other heating medium may be circulated to evaporate the hydrocyanic acid at the required rate. To dilute the gaseous hydrocyanic acid and retard the vigorous absorption, a certain amount of air is preferably admitted to the vaporizing chamber 44 through an air pipe 47. An additional quantity of air is preferably admitted through an inlet 48 to the hopper 39 to prevent condensation and absorption of moisture in the hopper and feed pipe 36.

If the gaseous hydrocyanic acid from the reaction chamber is substantially free from carbon dioxid, it may be delivered directly to the absorption chamber through a pipe 49 connected to the pipe 17 which delivers the gas from the reaction chamber. A suitable valve 50 is provided to control the flow of gas in the pipe 49. As previously noted, it is essential to success that the temperature of the absorption chamber be carefully regulated throughout the absorption. For this purpose a jacket 51 is provided about the absorption chamber. This jacket may be filled with a cooling medium if the operation is to be conducted at low temperatures but is preferably filled with heated oil to maintain a temperature above the boiling point of water. The steam formed in the course of the absorption is delivered from the absorption chamber through an outlet pipe 52 and this pipe is preferably surrounded by a portion of the jacket 51 to insure against condensation and return of the steam.

From the foregoing description it will be apparent that I have perfected a novel method of producing hydrocyanic acid and of recovering hydrocyanic acid in a gaseous or liquid form, or recombined as alkali metal cyanid. The product whether hydrocyanic acid or cyanid is substantially pure and is in condition for immediate use. The product may be recovered from relatively impure materials in an expeditious and satisfactory manner and at a relatively low cost. Thus hydrocyanic acid and cyanids of superior quality may be produced from inferior materials and at a relatively low expense.

Various changes may be made in the details of the method without departing from the invention or sacrificing any of the advantages above enumerated, the method and apparatus as hereinbefore described being illustrative merely of the invention which I desire to claim broadly as involving the separation and recovery of hydrocyanic acid from cyanid-containing material by causing carbon dioxid to react with the latter material under carefully regulated conditions.

I claim:

1. A method of producing hydrocyanic acid which comprises subjecting a solid cyanid containing material to the action of carbon dioxid and regulating the temperature of the mass in the reaction zone to prevent polymerization of the hydrocyanic acid.

2. A method of producing hydrocyanic acid which comprises subjecting a solid cyanid containing material to the action of carbon dioxid, regulating the temperature of the mass in the reaction zone to prevent polymerization of the hydrocyanic acid and cooling the gas escaping from the reaction zone to liquefy and recover the hydrocyanic acid.

3. A method of producing hydrocyanic acid which comprises subjecting a solid cyanid containing material to the action of carbon dioxid, regulating the temperature of the mass in the reaction zone to prevent polymerization of the hydrocyanic acid, cooling the gas escaping from the reaction zone to liquefy the hydrocyanic acid and returning uncondensed gas to the reaction zone.

4. A method of producing hydrocyanic acid which comprises subjecting a solid cyanid containing material to the action of carbon dioxid, regulating the temperature of the mass in the reaction zone to prevent polymerization of the hydrocyanic acid, separating the hydrocyanic acid from the gas escaping from the reaction zone, returning the residual gas to the reaction zone and admitting carbon dioxid in regulated quantity to the reaction zone.

5. A method of producing hydrocyanic acid which comprises subjecting a solid cyanid containing material to the action of furnace gases containing carbon dioxid, regulating the temperature of the mass in the reaction zone to prevent polymerization of the hydrocyanic acid and separating the hydrocyanic acid from the gas escaping from the reaction zone.

6. A method of producing hydrocyanic acid which comprises, subjecting crude solid products containing cyanid to the action of carbon dioxid, and regulating the temperature of the mass in the reaction zone to prevent polymerization of the hydrocyanic acid.

7. A method of producing hydrocyanic acid which comprises, continuously conveying solid cyanid containing material through a reaction zone, supplying carbon dioxid to said zone and regulating the temperature of the material in said zone to prevent polymerization of the hydrocyanic acid.

8. A method of producing hydrocyanic acid which comprises continuously conveying solid cyanid containing material through a reaction zone, supplying carbon dioxid to said zone, regulating the temperature of the material in said zone to prevent polymerization of the hydrocyanic acid, and cooling the gas escaping from said zone to liquefy the hydrocyanic acid.

9. A method of producing hydrocyanic acid which comprises continuously conveying solid cyanid containing material through a reaction zone, supplying carbon dioxid to said zone, regulating the temperature of the material in said zone to prevent polymerization of the hydrocyanic acid, cooling the gas escaping from said zone to liquefy the hydrocyanic acid and returning the residual gas to said zone.

10. A method of producing hydrocyanic acid which comprises continuously conveying crude solid products containing cyanid through a reaction zone, supplying carbon dioxid to said zone, and regulating the temperature of the mass in said zone to prevent polymerization of the hydrocyanic acid.

11. A method of producing hydrocyanic acid which comprises subjecting a solid cyanid containing material to the action of carbon dioxid and maintaining the temperature of the mass in the reaction zone above 100° C.

In testimony whereof I affix my signature.

FLOYD J. METZGER.